United States Patent
Laske, Jr.

(10) Patent No.: US 10,040,574 B1
(45) Date of Patent: Aug. 7, 2018

(54) AIRPLANE ANTI-HIJACKING SYSTEM

(71) Applicant: James William Laske, Jr., Vicksburg, MI (US)

(72) Inventor: James William Laske, Jr., Vicksburg, MI (US)

( * ) Notice: Subject to any disclaimer, the term of this patent is extended or adjusted under 35 U.S.C. 154(b) by 171 days.

(21) Appl. No.: 15/138,352

(22) Filed: Apr. 26, 2016

(51) Int. Cl.
*B64D 45/00* (2006.01)
*G06K 9/00* (2006.01)
*G07C 5/00* (2006.01)
*B64C 13/04* (2006.01)

(52) U.S. Cl.
CPC .......... *B64D 45/0015* (2013.01); *B64C 13/04* (2013.01); *G06K 9/00013* (2013.01); *G07C 5/008* (2013.01); *B64D 2045/004* (2013.01); *B64D 2045/0045* (2013.01); *B64D 2045/0055* (2013.01)

(58) Field of Classification Search
CPC .......... B64D 45/0015; B64C 13/04; G06K 9/00013; G07C 5/008
See application file for complete search history.

(56) References Cited

U.S. PATENT DOCUMENTS

| | | | | |
|---|---|---|---|---|
| 6,332,193 B1 * | 12/2001 | Glass | ....................... | G06F 21/32 713/170 |
| 6,641,087 B1 | 11/2003 | Nelson | | |
| 6,741,729 B2 * | 5/2004 | Bjorn | ....................... | G06F 21/32 340/5.83 |
| 6,845,302 B2 | 1/2005 | Moretto | | |
| D511,984 S | 11/2005 | Kumagai | | |
| 7,120,521 B2 | 10/2006 | Lilley | | |
| 7,145,477 B1 | 12/2006 | McBain | | |
| 7,350,748 B2 | 4/2008 | Matos | | |
| 7,549,161 B2 * | 6/2009 | Poo | ....................... | G06F 21/32 713/172 |
| 7,568,662 B1 | 8/2009 | Conner | | |
| 7,936,905 B2 * | 5/2011 | Takahashi | ............... | G06F 21/32 382/115 |
| 8,332,648 B2 * | 12/2012 | Morijiri | .................. | G06F 21/32 713/176 |
| 8,560,004 B1 * | 10/2013 | Tsvetkov | ................ | H04M 1/67 310/328 |
| 8,690,750 B2 * | 4/2014 | Krueger | ................ | A61M 21/00 600/27 |

(Continued)

FOREIGN PATENT DOCUMENTS

WO WO03045782 A1 6/2003
WO WO2003070568 A1 8/2003

*Primary Examiner* — Mia M Thomas
(74) *Attorney, Agent, or Firm* — Kyle A. Fletcher, Esq.

(57) ABSTRACT

The airplane anti-hijacking system is an access control, alarm, and lockout system that is installed on commercial aircraft for the purpose of preventing unauthorized persons from taking control of the aircraft. The airplane anti-hijacking system is a biometric system that authenticates the identity of the flight crew and automatically monitors the flight operation for anomalies. Should an anomaly occur in-flight, an emergency message is sent via satellite to the appropriate authorities. Upon receipt of an emergency message, airplane anti-hijacking system gives the appropriate authorities the ability to seize control of the aircraft by locking out in-flight control of the operation of the flight controls and operating the aircraft remotely. The airplane anti-hijacking system further comprises a craft control module and a plurality of biometric scanners.

18 Claims, 5 Drawing Sheets

(56) References Cited

U.S. PATENT DOCUMENTS

| | | | |
|---|---|---|---|
| 8,698,594 B2* | 4/2014 | Erhart | G06F 21/32 340/5.1 |
| 9,607,447 B2* | 3/2017 | Gremmert | G07C 5/008 |
| 2002/0030607 A1* | 3/2002 | Conner | B64C 27/82 340/945 |
| 2003/0055541 A1 | 3/2003 | Haley | |
| 2003/0193409 A1* | 10/2003 | Crank | B64D 45/0015 340/970 |
| 2004/0104807 A1* | 6/2004 | Ko | G06K 9/00006 340/5.83 |
| 2004/0264743 A1* | 12/2004 | Arnouse | B64D 45/0015 382/116 |
| 2006/0245620 A1* | 11/2006 | Roques | B64D 45/0015 382/115 |
| 2008/0087720 A1* | 4/2008 | Levitov | G06Q 20/4014 235/379 |
| 2014/0177929 A1* | 6/2014 | Erhart | G06F 21/32 382/124 |
| 2014/0254896 A1* | 9/2014 | Zhou | B25J 9/0006 382/124 |
| 2015/0186705 A1* | 7/2015 | Magi | G06K 9/0002 382/125 |
| 2016/0292932 A1* | 10/2016 | Gremmert | G07C 5/008 |
| 2016/0321496 A1* | 11/2016 | Mather | G06T 7/11 |
| 2017/0024553 A1* | 1/2017 | Chang | G06F 21/32 |
| 2017/0076132 A1* | 3/2017 | Sezan | G06K 9/00013 |
| 2017/0124376 A1* | 5/2017 | Wyrwas | G06K 9/00013 |
| 2017/0169271 A1* | 6/2017 | Setterberg | G06K 9/0002 |
| 2017/0200039 A1* | 7/2017 | Wright | G06K 9/00026 |
| 2017/0323492 A1* | 11/2017 | Gremmert | G08G 5/0013 |

* cited by examiner

FIG. 5

AIRPLANE ANTI-HIJACKING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of equipment adapted for use in aircraft, more specifically, an anti-hijacking security system.

SUMMARY OF INVENTION

The airplane anti-hijacking system is an access control, alarm, and lockout system that is installed on commercial corporate or fractional aircraft for the purpose of preventing unauthorized persons from taking control of the aircraft. The airplane anti-hijacking system is a biometric system that authenticates the identity of the flight crew. After the initial authentication, the airplane anti-hijacking system automatically monitors the flight operation for anomalies. Specifically, the airplane anti-hijacking system monitors cockpit operations to ensure that the properly cleared crew members of the authenticated flight crew are actually operating the cockpit controls. Should an unauthenticated person try to establish control of the aircraft either on the ground or in-flight, an emergency message is sent via satellite to the appropriate authorities and simultaneously activate the airplane anti-hijacking system by preparing the auto-flight operational systems for interaction with air traffic control and ground station pilots. In addition, a biometric keypad accessible from outside the cockpit can be activated by an authenticated crew member or other authorized persons, including but not limited to, flight attendants, air marshals, and other authenticated individuals, to generate an emergency message that is sent to the appropriate authorities and simultaneously activate the airplane anti-hijacking system by preparing the auto-flight operational systems for interaction with air traffic control and ground station pilots. Upon receipt of an emergency message from the airplane anti-hijacking system will immediately take control of the aircraft establishing safety of flight parameters, including but not limited to, minimum enroute altitude and work in conjunction with the appropriate authorities to seize control of the aircraft by locking out in-flight control of the operation of the flight controls and operating the aircraft remotely.

These together with additional objects, features and advantages of the airplane anti-hijacking system will be readily apparent to those of ordinary skill in the art upon reading the following detailed description of the presently preferred, but nonetheless illustrative, embodiments when taken in conjunction with the accompanying drawings.

In this respect, before explaining the current embodiments of the airplane anti-hijacking system in detail, it is to be understood that the airplane anti-hijacking system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the airplane anti-hijacking system.

It is therefore important that the claims be regarded as including such equivalent construction insofar as they do not depart from the spirit and scope of the airplane anti-hijacking system. It is also to be understood that the phraseology and terminology employed herein are for purposes of description and should no be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
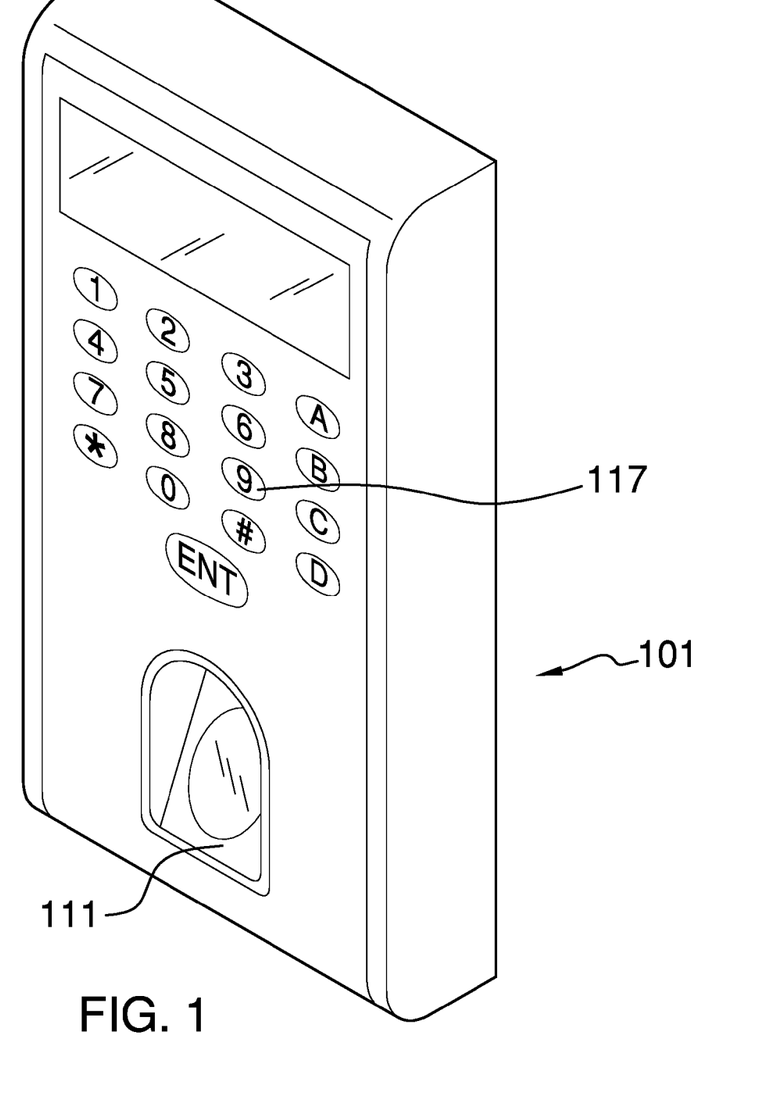
FIG. 1 is a perspective view of a detail of an embodiment of the disclosure.
Figure 2:
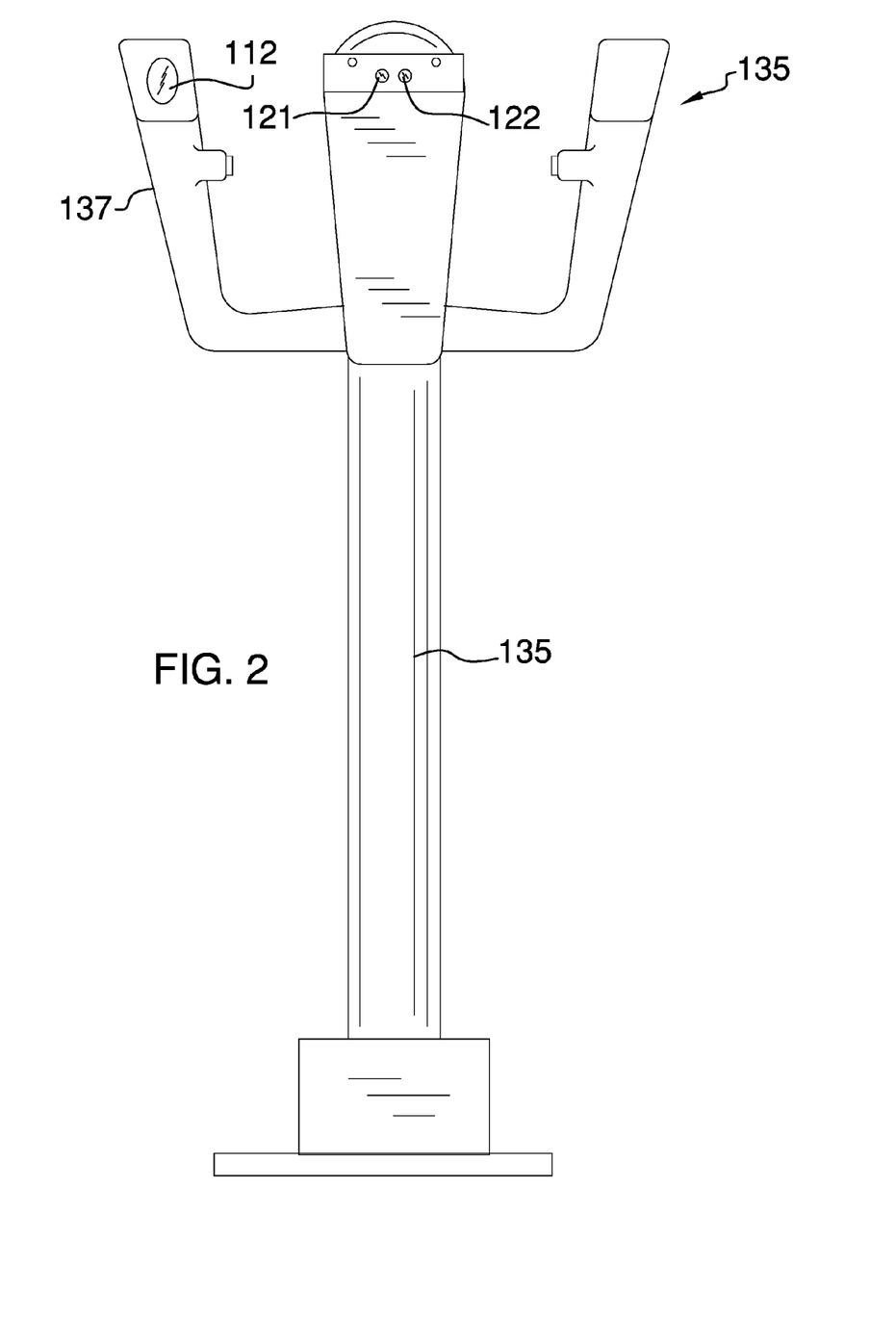
FIG. 2 is a front view of a detail of an embodiment of the disclosure.
Figure 3:
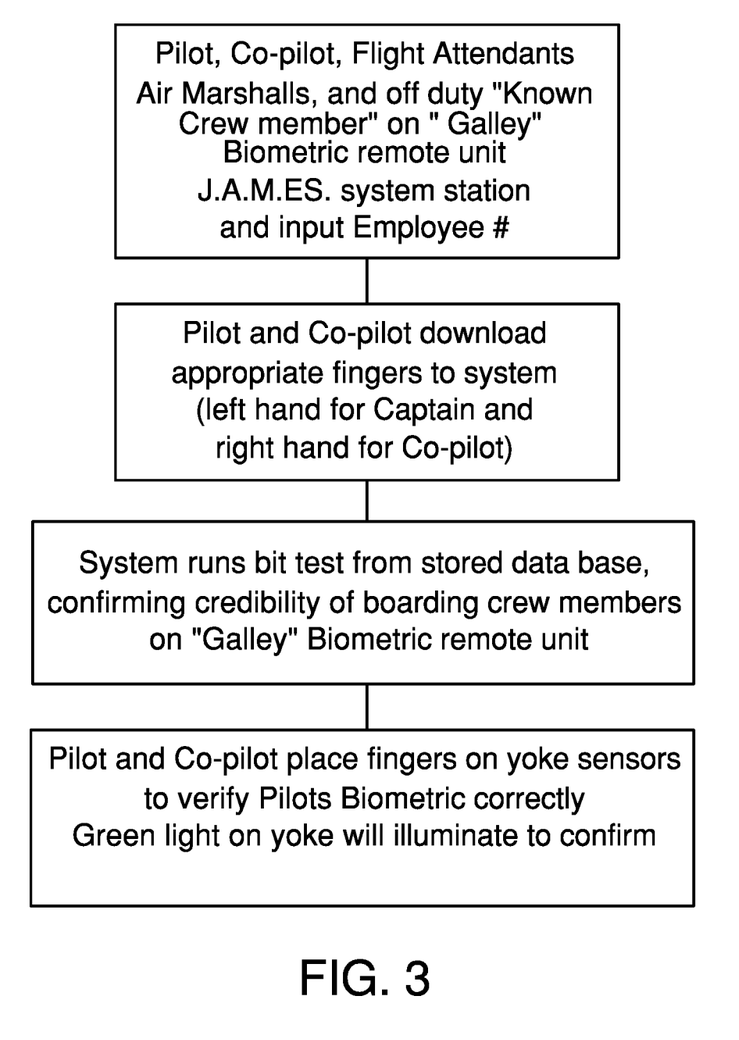
FIG. 3 is a flowchart of an embodiment of the disclosure.
Figure 4:
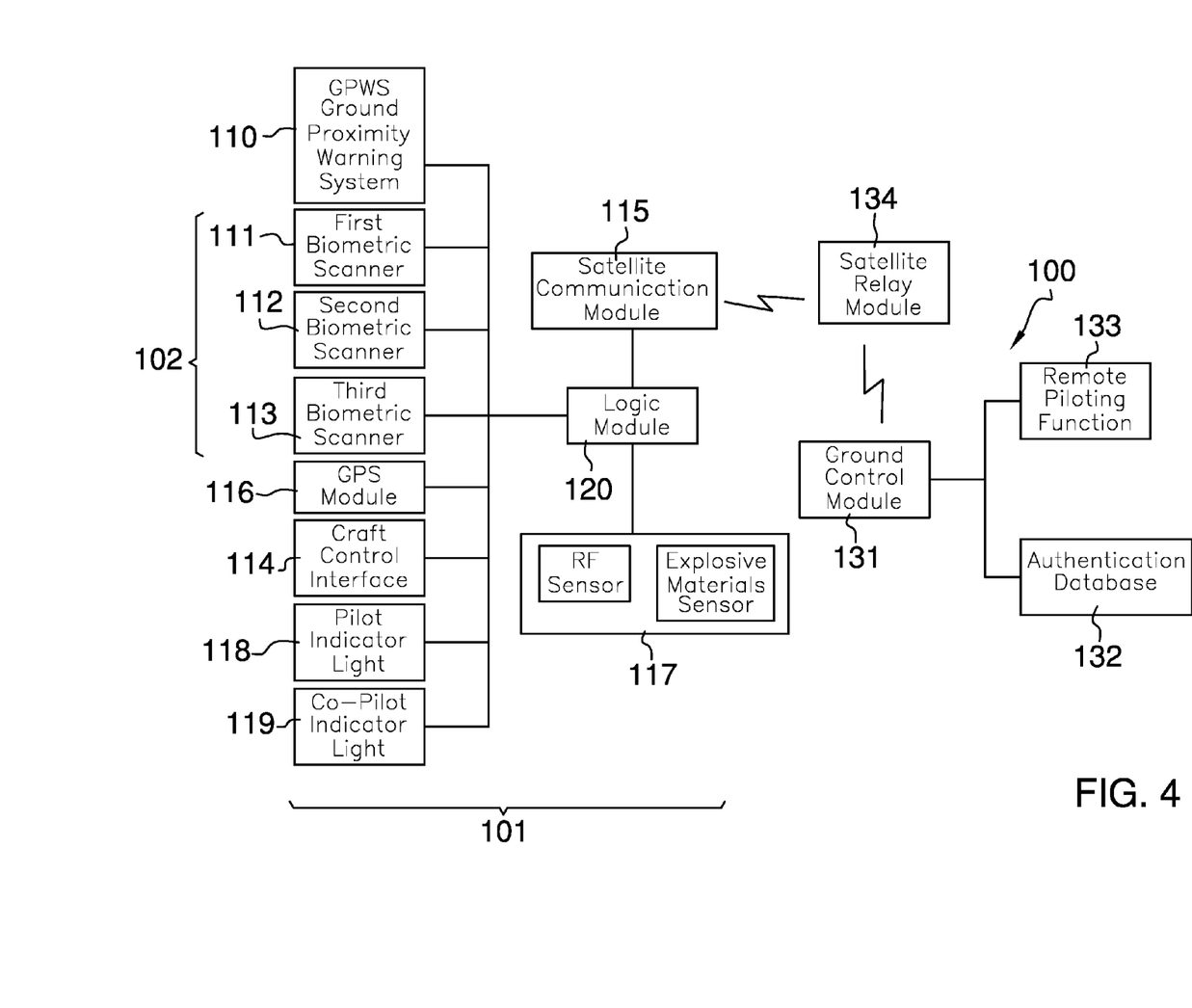
FIG. 4 is a block diagram of an embodiment of the disclosure.
Figure 5:
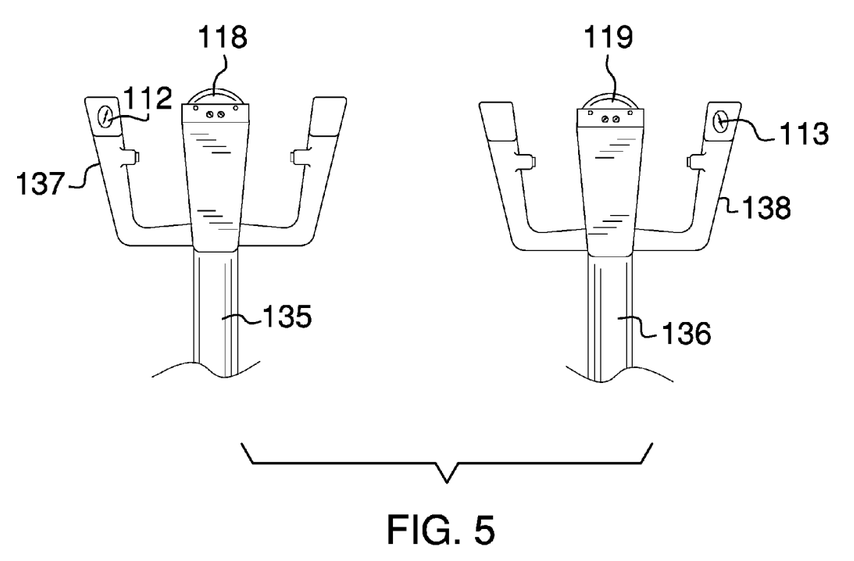
FIG. 5 is a detail view of an embodiment of the disclosure.

Detailed reference will now be made to a first potential embodiment of the disclosure, which is illustrated in FIGS. 1 through 5.

The airplane anti-hijacking system 100 (hereinafter invention) further comprises a craft control module 101 and a plurality of biometric scanners 102. The plurality of biometric scanners 102 further comprises a first biometric scanner 111, a second biometric scanner 112, and a third biometric scanner 113. The craft control module 101 further comprises a logic module 120, craft control interface 114, a satellite communication module 115, a GPS module 116, a GPWS module 110, a pilot indicator light 118, and a copilot indicator light 119. The first biometric scanner 111 is a commercially available biometric keypad. The invention 100 is adapted to work with a ground control module 131 that further comprises an authentication database 132 and a remote piloting function 133. The invention 100 communicates to the ground control module 131 through a satellite link 134.

The invention 100 is a security system that prevents inappropriate persons from gaining control of an aircraft while in-flight. The invention 100 does this through an access authentication function, an access control function, and a lock out function.

The access authentication function is a preflight procedure that authenticates the physical presence of each member of the flight crew. Specifically, each member of the flight crew, including but not limited to, pilots, flight attendants, air marshals, and off-duty known crew members, has their identity confirmed using the first biometric scanner 111 along with a personal identification code. The logic module 120 collects the personal identification code as well as the identifying information from the first biometric scanner 111. The logic module 120 then stores the identifying information of the cockpit crew for the duration of the flight. The logic module 120 then uses the satellite communication module 115 and the satellite link 134 to forward the personal identification code as well as the identifying information from the first biometric scanner 111 to the ground control module 131. The ground control module 131 compares the collected personal identification number and the identifying information from the first biometric scanner 111 for each member of the flight crew to an authentication standard that is stored in the authentication database 132. Once the ground control module 131 authenticates the identity of a flight crew member, the identity of that flight crew member is forwarded to the flight operations center of the airline operating the flight. In the final link of the access authentication function, the flight operations center of the airline operating the flight will not release the flight into operation until each member of the flight crew has been authenticated.

The access control function is an inflight authentication process that confirms that the flight crew is actually in command of the aircraft throughout the flight. The pilot yolk 135 is fitted with the second biometric scanner 112. The second biometric scanner 112 is located on the rear of the left hand grip 137 of the pilot yolk 135. The copilot yolk 136 is fitted with a third biometric scanner 113. The third biometric scanner 113 is located on the rear of the right hand grip 138 of the copilot yolk 136. As the aircraft is released into operation, the pilot and copilot reconfirm their identities using the second biometric scanner 112 and the third biometric scanner 113 respectively. The logic module 120 authenticates the identity of the pilot and the copilot using the identifying information collected when the flight crew initially authenticated their presence on the aircraft. The logic module 120 will repeatedly require biometric reauthorization from both the pilot and copilot through the course of the flight. The logic module 120 requests biometric reauthorization from the pilot using the pilot indicator light 118. The pilot indicator light 118 further comprises a first green LED 121 and a first red LED 122 mounted on the yolk 135 for the pilot.

When the first green LED 121 is illuminated, the pilot is authorized by the logic module 120. The logic module 120 will request reauthorization from the pilot by turning off the first green LED 121 and illuminating the first red LED 122. During periods when the pilot may not be authorized, the pilot yolk 135 will continue to operate normally until the lockout function is activated. The logic module 120 requests biometric reauthorization from the copilot using the copilot indicator light 119. The copilot indicator light 119 further comprises a second green LED 121 and a second red LED 122 mounted on the copilot yolk 136 for the copilot. When the second green LED 121 is illuminated, the copilot is authorized by the logic module 120. The logic module 120 will request reauthorization from the copilot by turning off the second green LED 121 and illuminating the second red LED 122. During periods when the copilot may not be authorized, the copilot yolk 136 will continue to operate normally until the lockout function is activated. The logic module 120 requests biometric reauthorization at staggered intervals.

The lockout function is activated in one of three conditions: 1) a pilot or copilot fails biometric authorization indicating an unauthenticated person has taken control of the aircraft; 2) both the pilot and the copilot have failed to honor an authentication request from the craft control module 101 which essentially indicates that nobody is flying the aircraft; or 3) a member of the cabin crew has authenticated on the first biometric scanner 111 during flight operation which acts as a "panic" button that indicates that the cockpit crew has lost control or contact with the cabin crew. When a condition indicating activation of the lockout function occurs, the craft control module 101 sends a message to the ground control module 131 requesting the lockout and through the craft control interface 14 establishes safety of flight parameters using onboard GPWS allowing the aircraft to remain clear of all obstacles such as terrain buildings and radio towers during the authentication process. The ground control module 131 forwards the message to the flight operations center of the airline operating the flight. After the appropriate arrangements have been made by the flight operations center of the airline operating the flight, the remote piloting function 133 of the ground control module 131 establishes contact with the craft control module 101. Once a remote piloting function 133 link is established with the ground control module 131, the craft control interface 114 disables the in-flight control of the aircraft and turns operational control of the aircraft over to the ground control module 131.

All communication between the craft control module 101 and the ground control module 131 includes GPS location information derived from the GPS module 116 and the GPWS module 110. This provides the flight operations center of the airline operating the flight independent verification of the position of the aircraft and threats due to obstacles at the time of the communication. The GPWS module 110 may also be referred to as a GPWS ground proximity warning system, which tracks altitude.

The logic module 120 may also be wired to an auxiliary sensor 117. The auxiliary sensor 117 is either or both an RF sensor or an explosive materials sensor. It shall be noted that the auxiliary sensor 117 provides the logic module 120 with data pertaining to a detection of any hazardous or explosive materials that could be loaded in an aircraft, such as cargo compartments, overhead bins in the cabin, or lavatories.

The following definitions were used in this disclosure:

GPWS: As used in this disclosure, GPWS is an acronym for Ground Proximity Warning System.

LED: As used in this disclosure, an LED is an acronym for a light emitting diode. A light emitting diode is a 2 lead semiconductor that is also a light source.

Logic Module: As used in this disclosure, a logic module is a programmable device that accepts digital and analog inputs, processes the digital and analog inputs according to previously stored instruction and to provide the results of these instructions as digital or analog outputs. Processor, microprocessors, and microcontrollers are synonyms.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A security system comprising:
   a craft control module and a plurality of biometric scanners;
   wherein the security system is adapted for use with an aircraft;
   wherein the security system is adapted to work with a ground control module;
   wherein the security system communicates to the ground control module through a satellite link;
   wherein the security system prevents inappropriate persons from gaining control of the aircraft while in-flight;
   wherein the security system authenticates the identity of each member of a flight crew before the flight begins operation;
   wherein the security system authenticates the identity of the cockpit crew during flight operation;
   wherein the security system locks out in-flight operational control of an aircraft when a security breech has been detected;
   wherein the security system turns control of the aircraft over to the ground control module when a security breech has been detected;
   wherein the plurality of biometric scanners further comprises a first biometric scanner, a second biometric scanner, and a third biometric scanner;
   wherein the craft control module further comprises, craft control interface, and a GPS module, a GPWS module, a pilot indicator light, and a copilot indicator light.

2. The security system according to claim 1 wherein the first biometric scanner is a biometric keypad.

3. The security system according to claim 2 wherein the first biometric scanner collects a personal identification code and biometric identification information from the first biometric scanner.

4. The security system according to claim 3 wherein the craft control module further comprises a logic module;
   wherein the first biometric scanner forwards the personal identification code and biometric identification information to the logic module.

5. The security system according to claim 4 wherein the logic module stores the biometric identification information of the cockpit crew for the duration of the flight.

6. The security system according to claim 5 wherein the craft control module further comprises a satellite communication module;
   wherein the logic module then uses the satellite communication module to forward the personal identification code as well as the biometric identification information from the first biometric scanner to the ground control module.

7. The security system according to claim 6 wherein the ground control module further comprises an authentication database;
   wherein the ground control module uses the authentication database to validate the personal identification code as well as the biometric identification information from the first biometric scanner received from the logic module.

8. The security system according to claim 7 wherein a pilot yolk is fitted with the second biometric scanner.

9. The security system according to claim 8 wherein the second biometric scanner is located on the left hand grip of the pilot yolk.

10. The security system according to claim 8 wherein a copilot yolk is fitted with the third biometric scanner.

11. The security system according to claim 10 wherein the third biometric scanner is located on the right hand grip of the copilot yolk.

12. The security system according to claim 10 wherein the pilot and copilot reconfirm their identities using the second biometric scanner and the third biometric scanner, respectively.

13. The security system according to claim 12 wherein the logic module authenticates the identity of the pilot and the copilot using the identifying information collected when the flight crew initially authenticated their presence on the aircraft.

14. The security system according to claim 13 wherein the logic module will repeatedly require biometric reauthorization from both the pilot and copilot through the course of the flight.

15. The security system according to claim 14 wherein the pilot yolk further comprises a pilot indicator light;
   wherein the logic module requests reauthorization from the pilot through signals sent through the pilot indicator light.

16. The security system according to claim 15 wherein the copilot yolk further comprises a copilot indicator light;
   wherein the logic module requests reauthorization from the copilot through signals sent through the copilot indicator light.

17. The security system according to claim 16 wherein the pilot indicator light further comprises a first green LED and a first red LED;
   wherein the copilot indicator light further comprises a second green LED and a second red LED; wherein should a pilot or copilot fail biometric authorization; a lockout function is initiated; wherein should both the first red LED and the second red LED be illuminated the lockout function is initiated;
   wherein should a member of the flight crew authenticate; using the first biometric scanner during flight operation the lockout function will be initiated;
   wherein the lockout function disables in-flight control of the aircraft;
   wherein the lockout function increases the aircraft altitude to the enroute minimum altitude should the aircraft be below the enroute minimum altitude; wherein the lockout function turns control of the aircraft over to the ground control module.

18. The security system according to claim 17 wherein the logic module is wired to an auxiliary sensor that includes either or both an RF sensor or an explosive materials sensor; wherein the auxiliary sensor provides the logic module with data pertaining to a detection of any hazardous or explosive materials.

* * * * *